(12) United States Patent
Fang et al.

(10) Patent No.: US 7,560,419 B2
(45) Date of Patent: Jul. 14, 2009

(54) METHOD AND BIODEGRADABLE SUPER ABSORBENT COMPOSITION FOR PREVENTING OR TREATING LOST CIRCULATION

(75) Inventors: Cindy Ching Fang, College Station, TX (US); Carl Joseph Thaemlitz, Katy, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 372 days.

(21) Appl. No.: 10/980,587

(22) Filed: Nov. 3, 2004

(65) Prior Publication Data
US 2006/0094604 A1    May 4, 2006

(51) Int. Cl.
C09K 8/68    (2006.01)
E21B 43/16    (2006.01)
(52) U.S. Cl. .................... 507/211; 166/305.1; 507/209; 507/203
(58) Field of Classification Search ......... 507/110–115, 507/209–217
See application file for complete search history.

(56) References Cited

U.S. PATENT DOCUMENTS

| | | | | |
|---|---|---|---|---|
| 3,202,214 | A | 8/1965 | McLaughlin, Jr. ............ | 166/30 |
| 3,376,926 | A | 4/1968 | McLaughlin, Jr. et al. ..... | 166/29 |
| 3,818,998 | A * | 6/1974 | Hessert ......................... | 175/72 |
| 3,953,336 | A | 4/1976 | Daigle ...................... | 252/8.5 A |
| 4,083,407 | A | 4/1978 | Griffin, Jr. et al. ........... | 166/291 |
| 4,172,066 | A | 10/1979 | Zweigle et al. ........ | 260/29.6 TA |
| 4,299,710 | A | 11/1981 | Dupre et al. ............. | 252/8.5 A |
| 4,478,640 | A | 10/1984 | Holland ........................ | 106/76 |
| 4,515,216 | A | 5/1985 | Childs et al. ................ | 166/293 |
| 4,572,295 | A | 2/1986 | Walley ........................ | 166/295 |
| 4,579,668 | A | 4/1986 | Messenger ............. | 252/8.5 LC |
| 4,635,726 | A * | 1/1987 | Walker ........................ | 166/294 |
| 4,664,816 | A | 5/1987 | Walker ..................... | 252/8.512 |
| 4,704,213 | A | 11/1987 | Delhommer et al. ..... | 252/8.512 |
| 4,914,170 | A | 4/1990 | Chang et al. | |
| 4,941,533 | A | 7/1990 | Buller et al. ................. | 166/252 |
| 5,086,841 | A | 2/1992 | Reid et al. | |
| 5,372,641 | A * | 12/1994 | Carpenter .................... | 106/714 |
| 5,439,057 | A | 8/1995 | Weaver et al. ................ | 166/295 |
| 5,550,189 | A | 8/1996 | Qin et al. ..................... | 252/54.3 |
| 5,986,042 | A | 11/1999 | Irizato et al. | |
| 6,110,875 | A * | 8/2000 | Tjon-Joe-Pin et al. ........ | 507/201 |
| 6,218,343 | B1 | 4/2001 | Burts, Jr. ..................... | 507/225 |
| 6,500,947 | B1 * | 12/2002 | West et al. ............... | 536/123.1 |
| 6,508,306 | B1 | 1/2003 | Reddy et al. ................. | 166/295 |
| 6,581,701 | B2 | 6/2003 | Heying ........................ | 175/72 |
| 6,767,867 | B2 | 7/2004 | Chatterji et al. ............. | 507/216 |
| 6,770,601 | B1 * | 8/2004 | Brookey ...................... | 507/102 |
| 6,777,377 | B2 | 8/2004 | Myers et al. ................. | 507/120 |
| 2002/0188040 | A1 | 12/2002 | Chen et al. .................... | 524/35 |
| 2003/0008779 | A1 | 1/2003 | Chen et al. ................... | 507/200 |
| 2003/0132000 | A1 | 7/2003 | Shaarpour | |
| 2003/0141062 | A1 * | 7/2003 | Cowan et al. ................ | 166/294 |
| 2003/0186819 | A1 | 10/2003 | Shaarpour | |
| 2003/0232965 | A1 * | 12/2003 | Bergeron ..................... | 530/300 |
| 2004/0149431 | A1 * | 8/2004 | Wylie et al. ............... | 166/242.1 |
| 2004/0168798 | A1 | 9/2004 | Creel et al. .................. | 166/270 |
| 2004/0168802 | A1 | 9/2004 | Creel et al. .................. | 166/293 |
| 2004/0168804 | A1 * | 9/2004 | Reddy et al. ................. | 166/295 |
| 2005/0288641 | A1 * | 12/2005 | Soerens ....................... | 604/368 |
| 2006/0032633 | A1 * | 2/2006 | Nguyen .................... | 166/280.2 |
| 2006/0079408 | A1 * | 4/2006 | Verret ......................... | 507/219 |
| 2006/0086501 | A1 * | 4/2006 | Creel et al. .................. | 166/281 |

FOREIGN PATENT DOCUMENTS

WO    WO 00/67809    11/2000
WO    WO 2004/076810 A1    9/2004

OTHER PUBLICATIONS

Xanthan Gum, http://www.isbu.ac.uk/water/hyxan.html, retrieved Jan. 13, 2009.*
Xanthan Gum, http://www.fuzing.com/vli/000935da3291/Xanthan-Gum, retrieved Jan. 13, 2009.*
Xanthan Gum, http://en.wikipedia.org/wiki/xanthan, retrieved Jan. 13, 2009.*
Superabsorbent polymer, Http://en.wikipedia.org/wiki/superabsorbent_polymer, retrieved Jan. 13, 2009.*
Mohammad J. Zohuriaam-Mehr et al., Superabsobent Polymer Materials: A Review, Iranian Polymer Jornal, 17 (6), 2008, 451-477.*
Erin Pytlik, Superabsorbent Polymers, http://www.eng.buffalo.edu/courses/ce435/Diapers/Diapers.html, retrieved Jan. 13, 2009.*
Baroid brochure entitled "Diamond Seal™" dated 1998.
Baroid brochure entitled "Hydro-Plug™ Lost Circulation Plug" dated 2002.
Patent application entitled "Methods of Using a Swelling Agent In a Wellbore", by Prentice G. Creel et al., U.S. Appl. No. 10/970,444, filed Oct. 20, 2004.

(Continued)

*Primary Examiner*—Timothy J. Kugel
(74) *Attorney, Agent, or Firm*—Craig W. Roddy; Karen B. Tripp

(57) ABSTRACT

A lost circulation material and method for treatment employing the material is provided that has particular utility in offshore applications because the material may be used with saltwater or brine, as well as with fresh water, and is biodegradable. The material comprises a biodegradable superabsorbent polysaccharide polymer that is preferably uncrosslinked and non-ionic and that is capable of absorbing multiple times its weight in sea water.

18 Claims, 1 Drawing Sheet

OTHER PUBLICATIONS

Foreign communication from a related counterpart application dated Dec. 14, 2005.

Halliburton Baroid Product Data Sheet for Hydro-Plug (TM) Lost Circulation Material, 2002.

Halliburton Baroid brochure entitled "Hydro-Plug (TM) Lost Circulation Plug, A Single-Sack Hydrating Crystallized Polymer Blend", 2002.

* cited by examiner

METHOD AND BIODEGRADABLE SUPER ABSORBENT COMPOSITION FOR PREVENTING OR TREATING LOST CIRCULATION

BACKGROUND OF THE INVENTION

1. Field of the Invention

The present invention pertains to methods and compositions for preventing or alleviating the loss of drilling fluids into a subterranean formation during drilling of boreholes in said formation.

2. Description of Relevant Art

In the oil and gas industry, a common problem in drilling wells or boreholes in subterranean formations is the loss of circulation of fluids, such as drilling fluids or muds in a well or borehole during the drilling. Such lost fluids typically go into fractures induced by excessive mud pressures, into pre-existing open fractures, or into large openings with structural strength in the formation.

A large variety of materials have been used or proposed in attempts to cure lost circulation. Generally, such materials may be divided into four types or categories: fibrous materials, such as shredded automobile tires or sawdust; flaky materials, such as wood chips and mica flakes; granular materials, such as ground nutshells; and slurries, whose strength increases with time after placement, such as hydraulic cement.

Another type of slurry that thickens downhole is made, typically, by dispersing a polyacrylamide in water and then emulsifying the dispersion in a paraffinic mineral oil, typically using a polyamine as an emulsifier. Bentonite is commonly added to such a slurry where it remains in the external or oil phase of the slurry. At normal shear rates, the bentonite rarely if at all contacts the water so the slurry remains relatively thin while being pumped down the drill pipe. At higher shear rates such as prevailing at the drill bit, the emulsion breaks and the bentonite mixes with the water. Crosslinking by the polyacrylamide results in a semi-solid mass that thickens further with the bentonite as it is pumped into cracks and fractures in the formation to block the lost circulation.

Although many materials and compositions exist and have been proposed for preventing lost circulation, there continues to be a need for more versatile and better compositions and methods for preventing loss of circulation.

SUMMARY OF THE INVENTION

The present invention provides an improved composition for preventing or alleviating loss of drilling fluids or circulation in a wellbore penetrating a subterranean formation. The composition is comprised of a superabsorbent, biodegradable, polymer capable of absorbing multiple times its weight in sea water. Preferably, the polymer is uncrosslinked polysaccharide, and most preferably comprises a combination of different polysaccharides non-ionic in character.

The method of the invention uses the composition of the invention in preventing or alleviating loss of drilling fluid or other fluid circulation in a wellbore penetrating a subterranean formation. In the method, the composition is preferably provided in a weighted or unweighted "pill" for introduction into the wellbore. Such "pills" typically comprise such composition blended with a small amount of drilling fluid, brine or fresh water. Such "pills" may further typically comprise natural mineral plugging type materials such as, for example, mica. The composition may be applied directly and does not need to be protected from sea water by placement in a capsule or other protective device or method. The amount of such composition used in such pill will depend on the size of the subterranean fracture, opening, or lost circulation zone to be treated. Multiple pills or treatments may be used if needed. Preferably drilling is stopped while the pill comprising the composition of the invention is introduced into and circulated in the wellbore. The composition of the invention will enter lost circulation zones or porous or fractured portions of the formation where it will prevent or retard the entry of drilling and other wellbore fluids.

Generally, the composition and method of the invention are effective in a wide range of high fluid loss situations. The composition and method of the invention are effective in preventing or alleviating fluid loss not only in drilling operations through highly fractured or depleted formations, but also in cementing and squeeze operations and in interwell communications due to induced fractures, injection or water flooding.

DETAILED DESCRIPTION OF PREFERRED EMBODIMENTS

Figure 1:
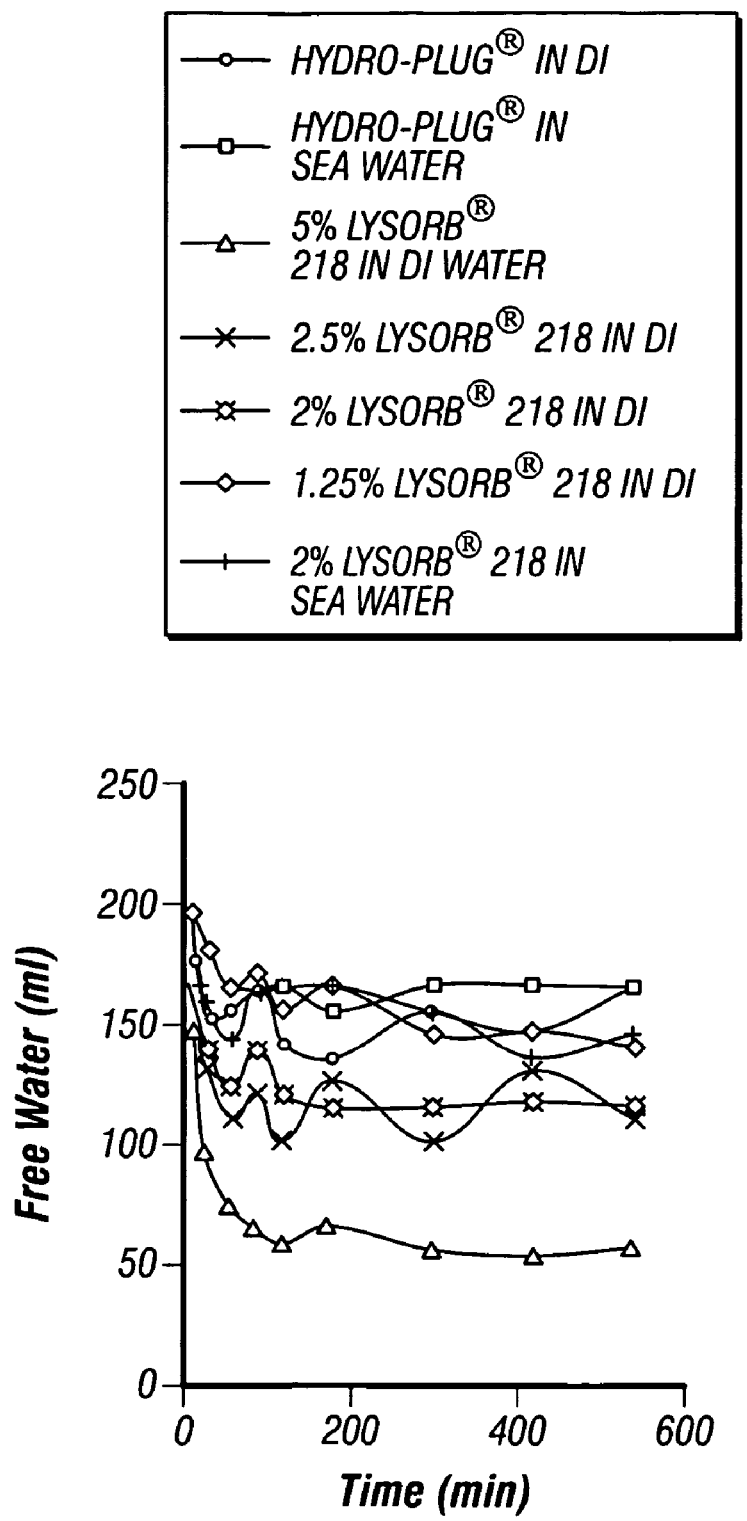
FIG. 1 is a graph comparing the absorption profiles of an example lost circulation material of the invention with a commercially available lost circulation material.

According to the present invention, a lost circulation material is provided comprising a biodegradable, superabsorbent material. A preferred example of a such a suitable superabsorbent material that is commercially available is LYSORB® superabsorbent material, a non-ionic, uncrosslinked, two polysaccharide blended polymer available from Groupe Lysac Inc. of Quebec, Canada, although other superabsorbent materials known to have utility in spill control and/or in manufacturing personal hygiene products, blotters, fiber optic cables, diapers, and sanitary napkins may have utility in the present invention. The superabsorbent material should be mixable with saltwater (or sea water or brine) as well as with freshwater and have an absorbency of about 2 g/g (fluid absorbed/superabsorbant) to about 500 g/g (fluid absorbed/superabsorbant) or an amount sufficient to cause expansion and blockage of the thief zone or fluid loss zone without expanding so quickly as to interfere with downhole equipment present or to inhibit introduction of the material into the borehole. The material is preferably non-ionic to facilitate such mixability with, and lack of deleterious sensitivity to, sea water. Generally, preferred superabsorbent materials for use in the invention are capable of absorbing at least about 20 times their weight or more in sea water or 1% NaCl solution and thus may preferably and advantageously be used in offshore drilling applications. For LYSORB® superabsorbent material, an absorbency of up to about 20 g/g is preferred although an absorbency of up to about 70 g/g is believed to be effective in the invention. Preferably, at least about 30% to about 60% or more of the superabsorbent material will biodegrade in less than or about 30 days, and about 98% of LYSORB® superabsorbent material is believed to biodegrade within about 28 days. However, materials with longer or even shorter biodegradation times might be selected. Non-crosslinked materials are believed to provide faster rates of biodegradation.

According to the method of the invention, the composition of the invention is used as a lost circulation material or in preventing or treating lost circulation in a wellbore. That is, a pill or plug comprising the composition of the invention and fresh water or saltwater (or sea water or brine) is introduced into the wellbore and allowed to circulate through the wellbore at least to the zone needing lost circulation treatment or to the zone where lost circulation is believed to likely occur. There is no need to protect the composition from sea water as by placing the composition in a capsule. Rather, the composition may advantageously be introduced directly into the wellbore. The composition of the invention is then allowed to enter the lost circulation zone. Such zone may be or may comprise or include, without limitation, fractures and porous formations. In such zone, the composition of the invention reduces, eliminates or prevents the entry of drilling fluid and/or other well fluids into said zone.

Preferably, drilling is stopped during this treatment. That is, drilling is preferably stopped while the pill is pumped downhole and spotted across the fluid loss zone and preferably remains stopped for about two to three hours thereafter. Gentle squeeze pressures such as about 150 to about 250 psi may be used to facilitate penetration of the pill into the fractures. Repetition of the treatment or multiple pills may be used if needed.

The biodegradable, superabsorbent material is typically mixed with water based drilling fluids or added to other lost circulation materials for oil field applications.

Tests were conducted comparing a preferred superabsorbent material for use in the present invention, LYSORB® 218 material, available from Groupe Lysac in Quebec, Canada, with a commercially available lost circulation material, DIAMOND SEAL® crystalline synthetic polymer, available from Halliburton Energy Services, Inc. in Houston, Tex., and an experimental water absorbent polymer comprised of polyacrylonitrile grafted onto corn starch material, available from Chemstar in Minneapolis, Minn. Absorption efficiency was measured with the three materials in sea water. The results of these tests are summarized in Table I.

TABLE I

| | Absorption Efficiency in Sea Water | | |
|---|---|---|---|
| TIME | LYSORB® 218 Material (g/g) | DIAMOND SEAL® Material (g/g) | Polyacrylonitrile-Corn Starch Material (g/g) |
| 5 minutes | 10.5 | 3 | 10 |
| 15 minutes | 14.5 | 6 | 11 |
| 30 minutes | 16 | 8 | 11 |
| 45 minutes | 17 | 11 | 11 |
| 1 hour | 18 | 15 | 11 |
| 3 hours | 20 | 21.5 | 11 |
| 5 hours | 21 | 24 | 11 |
| 7 hours | 21 | 26 | 11 |
| 9 hours | 21 | 26.5 | 11 |
| 24 hours | 21 | 29.5 | 11 |

G/G = Grams of Fluid Absorbed per Gram of Superabsorbent Material Used

The tests demonstrated that LYSORB® 218 material has about 71% absorption efficiency compared to DIAMOND SEAL® crystalline synthetic polymer in sea water and has greater absorption efficiency than the polyacrylonitrile grafted onto corn starch material.

Further, absorption profiles were measured for varying amounts of LYSORB® 218 material and compared to absorption profiles for HYDRO-PLUG® lost circulation material available from Halliburton Energy Services, Inc. in Houston, Tex., in both sea water and in deionized water. The results of these tests are graphed in FIG. 1. These tests showed that LYSORB® 218 material has a faster absorption rate than HYDRO-PLUG® material but the rate may be slowed to approximate that of HYDRO-PLUG® material by reducing the amount of LYSORB® 218 material used.

The foregoing description of the invention is intended to be a description of preferred embodiments. Various changes in the details of the described composition and method can be made without departing from the intended scope of this invention as defined by the appended claims.

What is claimed is:

1. A method of treating a subterranean zone penetrated by a wellbore, said method comprising introducing directly into the wellbore and then into said zone a lost circulation material consisting of a biodegradable superabsorbent non-ionic and non-crosslinked polysaccharide lost circulation material capable of absorbing about 20 times its weight in sea water, without need for protection from the sea water.

2. The method of claim 1 wherein the polysaccharide is mixable with freshwater and with saltwater.

3. The method of claim 1 wherein said zone is a highly fractured or depleted formation and said treating is to prevent or alleviate drilling fluid loss during drilling operations through said zone.

4. The method of claim 1 wherein said zone comprises an interwell communication with another zone and said treating is to prevent or alleviate fluid loss during well operations in said zone.

5. The method of claim 1 wherein said treating comprises cementing or squeezing operations.

6. The method of claim 1 wherein at least about 30% to about 60% of said biodegradable superabsorbent non-ionic and non-crosslinked polysaccharide lost circulation material biodegrades in less than about 30 days after introduction in said wellbore and/or about 98% of said biodegradable superabsorbent non-ionic and non-crosslinked polysaccharide lost circulation material biodegrades within about 28 days after introduction in said wellbore.

7. A method for reducing lost circulation during drilling comprising introducing directly into said wellbore a pill comprising a biodegradable superabsorbent lost circulation material consisting of a biodegradable superabsorbent non-ionic non-crosslinked polysaccharide polymer capable of absorbing about 20 times its weight in sea water, without need for protection from the sea water.

8. The method of claim 7 wherein said pill further comprises a natural mineral material.

9. The method of claim 8 wherein said natural mineral material comprises mica.

10. The method of claim 7 wherein drilling is stopped while the pill is introduced into the wellbore.

11. The method of claim 10 wherein drilling remains stopped for about two to three hours after the pill is introduced into the wellbore.

12. The method of claim 7 further comprising circulating said pill within the wellbore such that the pill enters a lost circulation zone to prevent or retard lost circulation.

13. The method of claim 12 further comprising facilitating said entry or penetration of the pill into said lost circulation zone with squeeze pressures ranging from about 150 psi to about 250 psi.

14. The method of claim 7 wherein said pill further comprises freshwater or saltwater.

15. The method of claim 7 wherein said lost circulation material is a polysaccharide polymer having an absorbency of about 2 g/g to about 500 g/g.

16. The method of claim 7 wherein said lost circulation material is a polysaccharide polymer having an absorbency of about 2 g/g to about 70 g/g.

17. The method of claim 7 wherein said polysaccharide polymer is a blend of different polysaccharides.

18. The method of claim 7 wherein at least about 30% to about 60% of said biodegradable superabsorbent non-ionic non-crosslinked polysaccharide biodegrades in less than about 30 days after introduction in said wellbore and/or about 98% of said biodegradable superabsorbent non-ionic non-crosslinked polysaccharide biodegrades within about 28 days after introduction in said wellbore.

* * * * *